Jan. 26, 1954  J. AMELINE  2,666,928
TOOLHOLDER DEVICE FOR PROSTHESIS APPARATUS FOR THE UPPER
LIMBS, TO BE SECURED ON THE STUMP OF AN AMPUTATED ARM
Filed Nov. 10, 1952  3 Sheets-Sheet 1
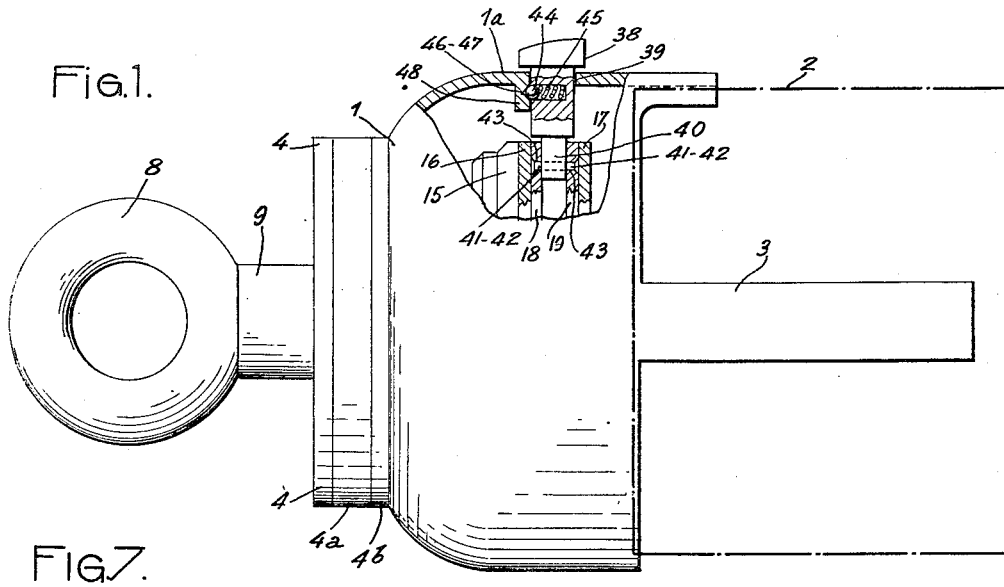
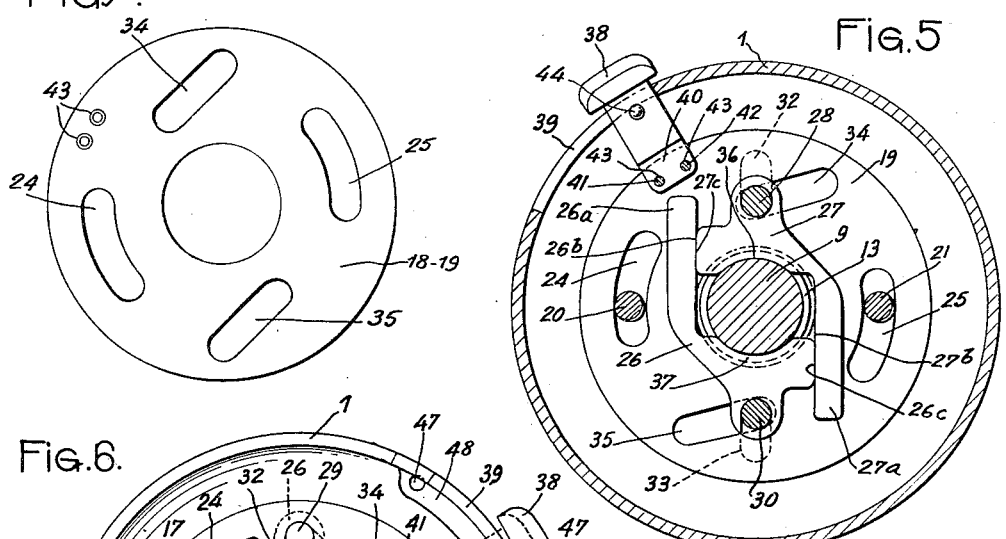
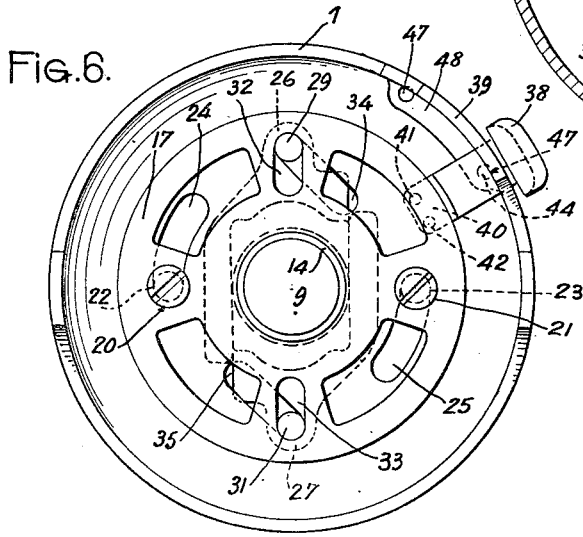
Inventor
Jean Ameline,
By
Attorney Jan. 26, 1954  J. AMELINE  2,666,928
TOOLHOLDER DEVICE FOR PROSTHESIS APPARATUS FOR THE UPPER
LIMBS, TO BE SECURED ON THE STUMP OF AN AMPUTATED ARM
Filed Nov. 10, 1952  3 Sheets-Sheet 2

Inventor
Jean Ameline,
By
Attorney

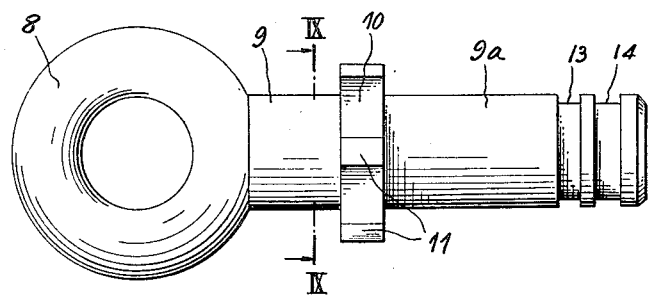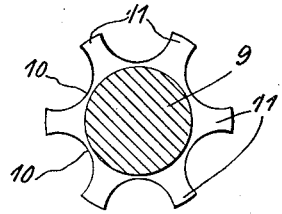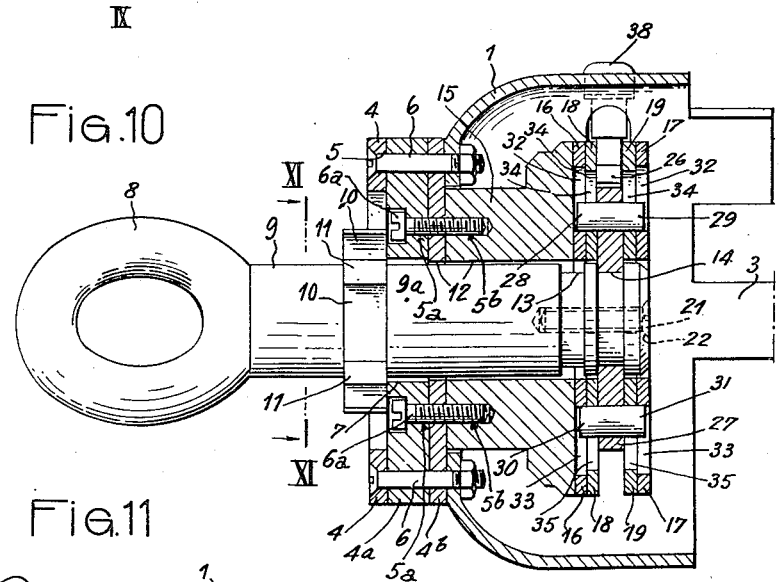

Patented Jan. 26, 1954

2,666,928

UNITED STATES PATENT OFFICE 2,666,928

TOOLHOLDER DEVICE FOR PROSTHESIS APPARATUS FOR THE UPPER LIMBS, TO BE SECURED ON THE STUMP OF AN AMPUTATED ARM

Jean Ameline, Sceaux, France

Application November 10, 1952, Serial No. 319,749

Claims priority, application France July 7, 1949

4 Claims. (Cl. 3—12.8)

This invention relates to a prosthesis apparatus for the upper limbs and more particularly to a tool holding chuck device.

This device is adapted for attachment of a tool in two different relations, either immobilized in a predetermined position or capable of movement to selected position. The mounting and dismounting of the tool, as well as the locking of the tool in one of its two selected relations being effected by depression of a slidable knob, so that tool locking may be carried out without undue difficulty by the mutilated person.

One type of embodiment of the device according to the invention is shown, by way of example, in the appended drawings, wherein:

Fig. 1 is a side view in elevation, partly broken away, of the device, the part in cross section corresponding to line I—I of Fig. 4.

Fig. 5 is a cross-sectional view similar to Fig. 4 but showing the device in locked position.

Fig. 6 is a view in elevation of the rear end of the device and corresponding to line VI—VI of Fig. 2.

Fig. 7 is a view in elevation of one of the two revolving discs of the device.

Fig. 8 is a side view in elevation of the stem of a tool of any type.

Fig. 9 is a cross-sectional view taken along line IX—IX of Fig. 8.

Fig. 10 is a cross-sectional view similar to Fig. 2 but showing another position of the tool, and Fig. 11 is a cross-sectional view taken along line XI—XI of Fig. 10.

The device comprises a cap 1 containing the mechanical parts and which is placed at the end of the orthopedic apparatus 2 placed on the stump (not shown). Two diametrically opposite blades 3 or attachment arms, integral with said cap, are used for support along the stump and/or of the orthopedic apparatus.

Figure 2:
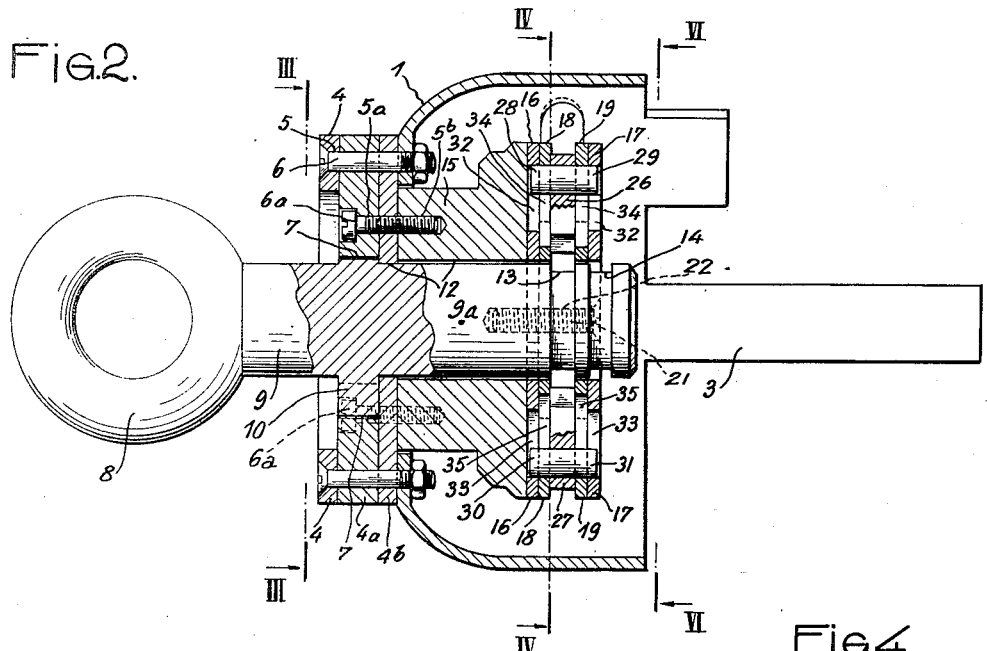
Fig. 2 is a cross-sectional view taken along line II—II of Fig. 3.
Figure 4:
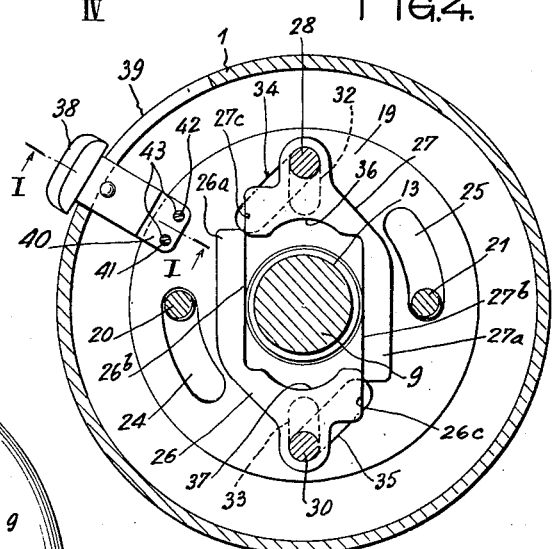
Fig. 4 is a cross-sectional view taken along line IV—IV of Fig. 2.
Figure 3:
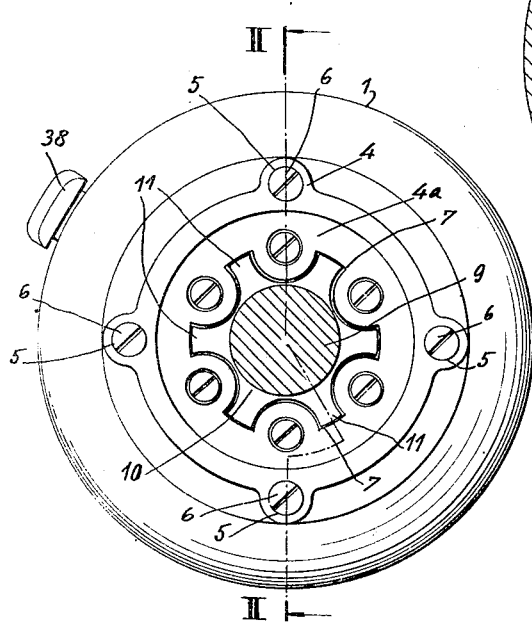
Fig. 3 is a cross-sectional view taken along line III—III of Fig. 2.

On the front of the cap is fixed a part 4 offering holes 5 (Figs. 2, 3 and 10) for attaching it on the cap 1 by means of screws 6. In the example shown, the part 4 consists of three similar washers 4, 4a, 4b, stamped out to facilitate the manufacture but it could consist of a single part 4, obtained, for instance, by casting. The washer 4a comprises a star-shaped recess 7 (Figs. 2, 3 and 10). A tool, such as the ring 8 (Figs. 1, 2, 8 and 10) which might also be a hook, an artificial hand, pincers or the like, is mounted on a stem 9 which carries a star 10 (Figs. 2, 3, 8–10) having teeth 11 with a shape corresponding exactly to the recesses 7 of the washer 4a, so that when the end 9a (Figs. 2, 8 and 10) of the stem 9 is engaged in the hole 12 (Figs. 2 and 10) of the device, the teeth 11 fit exactly into the recesses 7, holding the stem 9 of the tool motionless in the washer 4a. The end 9a of the tool stem also comprises two grooves 13, 14, the function of which shall be explained further on.

Inside the cap 1, the device comprises (Fig. 2) a part 15 bored in 12 which is also shown in Figs. 1 and 10 and to which the part 4 is attached by screws 6a (Figs. 2 and 10) passing through holes 5a and into threaded holes 5b of the part 15.

The part 15 supports a device comprising two fixed discs 16, 17 (Figs. 1, 2, 6 and 10) and two movable or revolving discs 18, 19, one of which is shown in Fig. 7. Two screws 20 and 21 (Figs. 2, 4–6 and 10) passing through holes 22, 23 in the discs 16, 17, hold the latter fixedly to the part 15.

These screws 20, 21 also pass through arcuate slots 24, 25 (Figs. 4–7) of the discs 18, 19. Two jaws 26, 27 (Figs. 2, 4–6 and 10) interposed between the two movable discs 18, 19, each comprises two studs 28, 29, 30, 31, respectively. These studs are engaged in vertical slots 32, 33 of the two fixed discs 16, 17 and in oblique slots 34, 35 of the two revolving discs 18, 19, guided during their rotation motion by their slots 24, 25 moving over the screws 20, 21.

The jaws 26, 27 comprise, above the lug carrying studs 28, 29, 30, 31, arcuate edges 36 and 37 (Figs. 4 and 5) for selectively engaging one of the two grooves 13, 14 of the stem portion 9a of the tool. The branches 26a, 27a of jaws 26, 27 have on their inner sides, rectilinear edges 26b, 27b which slide respectively on the rectilinear edges 26c, 27c of the cooperating jaws, so as to ensure a parallel guiding of the two jaws, with respect to each other.

A control knob 38 (Figs. 1, 3–6, 10 and 11) which is slidable in a slot 39 (Figs. 1 and 4–6) in the cap 1, extended towards the rear 1a (Fig. 1) of the cap 1, comprises in a reduced portion 40 having two pairs of studs 41, 42, which seat in holes 43 in each one of the two revolving discs 18, 19.

A spring biased ball 44 in a bore 45 (Fig. 1) transversely in the knob 38, cooperates with cavities 46, 47 (Figs. 1 and 6) in an edge 48 of the slot 39 of the cap 1 to retain the knob in selected positions.

The device operates as follows:

When the tool 8 is engaged through its stem 9 into the hole 12 provided in the front of the device, the end 9a of said stem goes through the part 4, then through the bore 12 in the part 15 and through the stack constituted by the washers and jaws 16, 18, 26, 27, 19 and 17. If the engagement is made as far as possible, the teeth 11, of the star fixed on the stem 9, fit into the recesses 7 of the washer 4a, so that the stem is held and is incapable of rotating. By moving the knob 38 clockwise, according to Fig. 4, the discs 18, 19 undergo a rotation motion so that their oblique slots 34, 35 acting on the studs 28, 29, 30 and 31 cause these studs to slide in the vertical slots 32, 33 of the fixed discs 16, 17, which has the effect of moving the two jaws 26, 27 which engage by their arcuate edges 36, 37 into the groove 13 of the stem 9, 9a (Fig. 5) of the tool which is thus locked.

On the contrary, if the stem 9, 9a is only pushed into the hole in the support by bringing the groove 14 in front of the jaws 26, 27, that is, the star 10 is pushed against the washer 4a (Fig. 10), these jaws may be similarly engaged into this groove to lock the tool but, inasmuch as the star 10 is not fitted into the recess 7 of the washer 4a, and is, on the contrary, held outside said washer, the stem 9 and the tool 8 may rotate freely in the support.

Since it is sufficient to push the knob 38 to the left or to the right as the case may be, to cause the locking or the unlocking of the stem of the tool, either in the position of immobilization wherein the jaws 26, 27 engage into the groove 13 or in the holding position, allowing the free rotation of the tool, when the jaws are engaged into the groove 14, the control is extremely easy and the mutilated person can easily effect himself the change of tool and the locking of the latter in that of the two positions he may desire.

The body of the device may be made of light metal, such as Duralumin or the like, or of any other suitable material. The light metal construction makes it possible to obtain an extralight holder.

Various modifications may be made in the example of embodiment represented and described within the scope of the invention.

I claim:

1. A tool holder device for prosthesis apparatus for the upper limbs, comprising a cap, two attachment arms secured to the rear of the cap, a part provided with a star-shaped recess, means for securing said recessed part to the front of the cap, a bored part in the cap and secured to the rear of the recessed part, two fixed discs secured to the rear of said bored part, two movable discs interposed between said two fixed discs, two cooperating jaws interposed between said two movable discs, a control knob secured to said two movable discs, means connecting the jaws with the movable and fixed discs, a tool, a star, and a stem supporting said tool and said star and engaged in the recessed and bored parts and in the fixed and movable discs.

2. A tool holder device for prosthesis apparatus for the upper limbs, comprising a cap, two attachment arms secured to the cap at the rear thereof, a first washer provided with a cylindrical hole, a second washer provided with a star-shaped hole and secured to the first washer, a third washer provided with a cylindrical hole of smaller diameter than the cylindrical hole in the first washer and secured to the second washer, screws passing through said three washers, and screwed to the front of the cap, a bored part in the cap and secured to the rear of the second washer, two fixed discs secured to the rear of said bored part, two movable discs interposed between said two fixed discs, two cooperating jaws interposed between said two movable discs, a control knob secured to said two movable discs, means connecting the jaws with the movable and fixed discs, a tool, a star, and a stem supporting said tool and said star and engaged in the recessed part and in the bored part.

3. A tool holder device for prosthesis apparatus for the upper limbs, comprising a cap, two attachment arms secured to the cap at the rear thereof, a part provided with a star recess, means for securing said recessed part to the front of said cap, a bored part in the cap and secured to the rear of the recessed part, two fixed discs secured to the rear of said bored part and provided with vertical slots, two movable discs interposed between said two fixed discs and provided with slots which are oblique to the vertical slots in the fixed discs, two cooperating jaws interposed between said two movable discs, studs rigidly fixed to the cooperating jaws and engaged in the oblique and vertical slots of the movable and fixed discs respectively, a control knob secured to said two movable discs, a tool, a star, and a stem supporting said tool and said star and engaged in the recessed part and in the bored part.

4. A tool holder device for prosthesis apparatus for the upper limbs, comprising a cap, two attachment arms secured to the cap at the rear thereof, a part provided with a star recess, means for securing said recessed part to the front of said cap, a bored part in the cap and secured to the rear of the recessed part, two fixed discs secured to the rear of said bored part, two movable discs interposed between said two fixed discs and each provided with two pairs of holes, two cooperating jaws interposed between said two movable discs, a control knob, two pairs of studs secured to said control knob and engaging in the two pairs of holes in the two movable discs, means connecting the jaws with the movable discs and the fixed discs, a tool, a star, and a stem supporting said tool and said star and engaged in the recessed and bored parts and in the fixed and movable discs and between the cooperating jaws, said stem being provided at its end with grooves in which the cooperating jaws engage.

JEAN AMELINE.

References Cited in the file of this patent

FOREIGN PATENTS

| Number | Country | Date |
|---|---|---|
| 990,413 | France | June 6, 1951 |